Jan. 1, 1952     M. R. FIELDS     2,581,182
INHALER

Filed March 14, 1950     2 SHEETS—SHEET 1

INVENTOR.
Mack R. Fields
BY Albert E. Knauf
Atty.

Jan. 1, 1952
M. R. FIELDS
INHALER
2,581,182
Filed March 14, 1950
2 SHEETS—SHEET 2
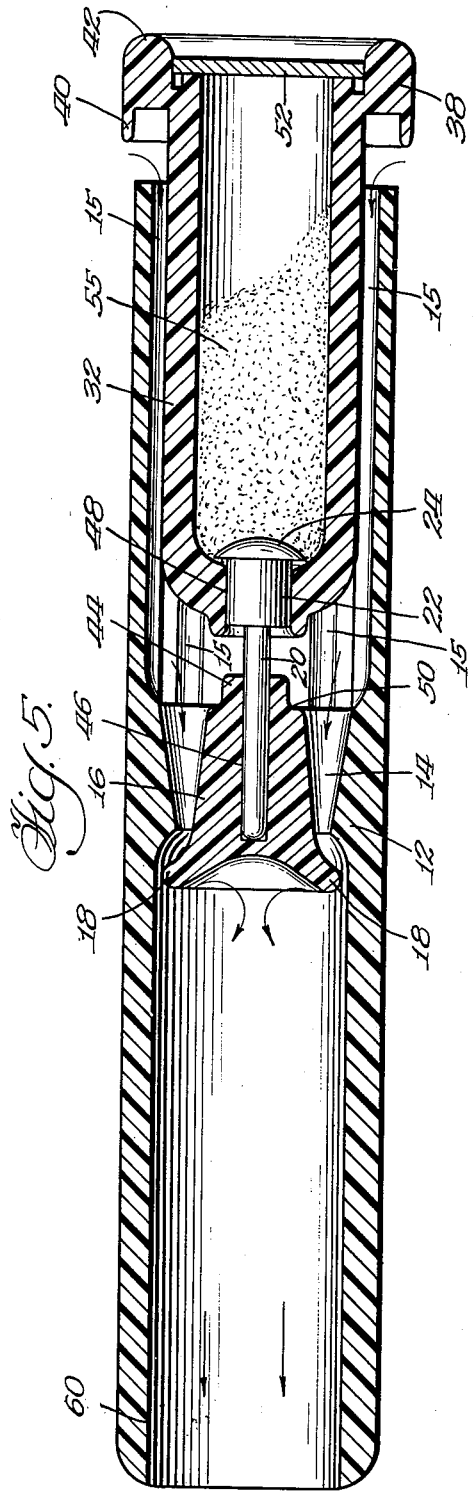
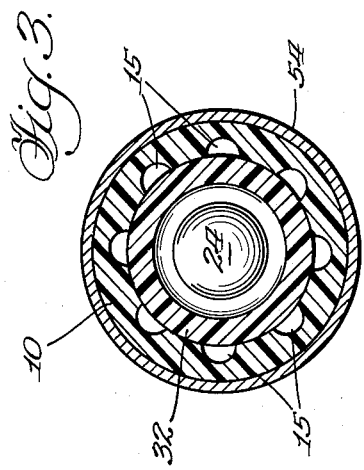
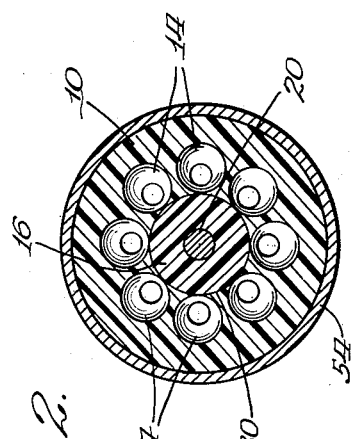
INVENTOR.
Mack R. Fields
BY Albert E. Knauf
Atty.

Patented Jan. 1, 1952

2,581,182

UNITED STATES PATENT OFFICE 2,581,182

INHALER

Mack R. Fields, Libertyville, Ill., assignor to Abbott Laboratories, North Chicago, Ill., a corporation of Illinois Application March 14, 1950, Serial No. 149,491

8 Claims. (Cl. 128—206)

This invention relates to new and improved inhalers and more particularly to inhalers adapted to dispense a powdered medicament.

Included among the objects and advantages of the invention is the dispensing of an exact, predetermined and very small dosage of a powdered medicament on each inhalation drawn through the inhaler.

In the prior art there have been proposed many types of inhalers including liquid, vapor and powder inhaling devices, but none are capable of dispensing an exact dosage on each inhalation of any of the types of medicament used. Obviously, the total dosage may be controlled by the amount of medicament originally charged into the inhaler.

Certain drugs are extremely potent in very small quantities, and though the total dosage to be administered over a period of time is not overly toxic, the entire dosage or substantial part of it, if taken at one time, will ordinarily manifest toxic symptoms. It is important that such potent drugs be accurately dispensed in the unit dosages as well as the total dosage.

Referring to the drawings:

Figure 2 is a section on line 2—2 of Figure 1;

Figure 3 is a section taken on line 3—3 of Figure 1;

Figure 5 is a section of the inhaler in delivery position.

Figure 4:
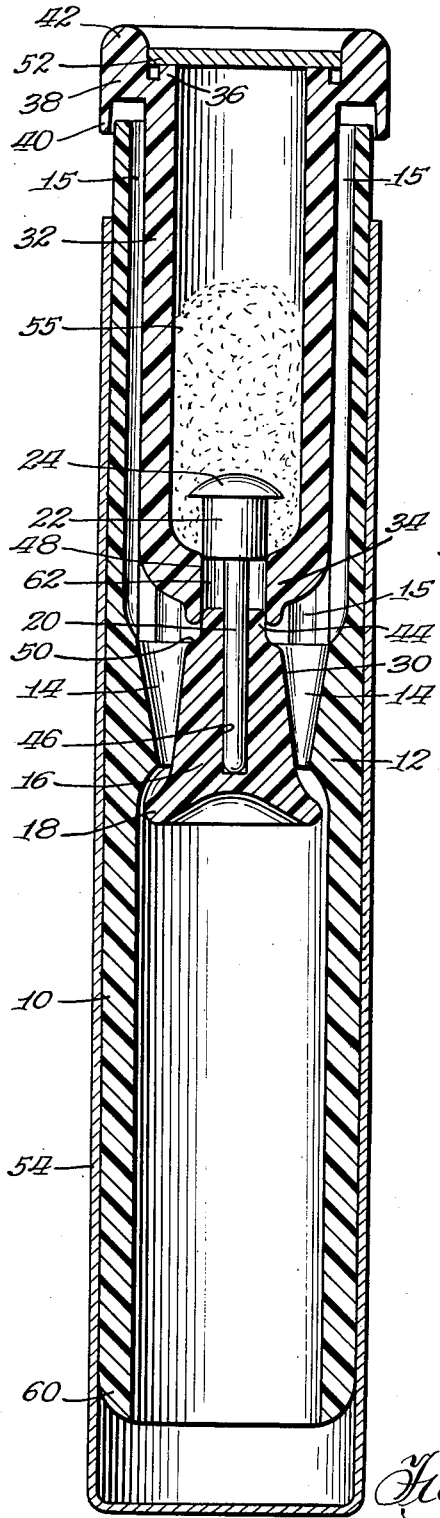
Figure 4 is a vertical section of thhe inhaler showing the position of the parts thereof during the manipulation to measure out powder.

In the embodiment of the invention selected for illustration, the inhaler comprises a main body 10 of transparent polyethylene plastic, having an annular constriction 12 approximately in the middle of the tube. The constriction 12 is an enlarged wall section with a central conical hole 30 surrounded by eight inverted conical holes 14. A plastic medicament tube 32 is of a size to be easily slidable in the main tube 10 and is disposed in the tube in the end above the constriction 12. The medicament container 32 comprises a tube having a constricted end portion 34 and an upper end 36. Adjacent the upper end 36 there is an overhanging lip portion 38 having a downward skirt 40 and an upward bulge 42. A conical baffle plug 16 is heat-sealed into the conical hole 30. The baffle has a flared skirt 18 on the larger end, and a small tip 44 on the smaller end. A stainless metal pin 20 is seated with a pressed fit into a hole 46 in the baffle 16. The pin 20 has an enlarged portion 22 spaced above the top of the baffle 16, and a crown 24 at the top of the enlarged end 22.

The restricted end 34 of the medicament container 32 defines a small cylinder 62 having a wall 48, which fits over the enlarged portion 22.

The medicament container 32 is axially slidable in the tube 10. The shoulder 50 of the plug 16 restricts the inward movement of the medicament chamber, and the crown 24 restricts the outward movement. The parts of the constricted end 34 of the medicament tube and the enlarged portion 22 of the pin are so made that the constricted end 34 of the medicament tube is closed at all times in any position of the medicament tube in the sense that powder from the medicament chamber 32 cannot pass freely into the main tube 10. The outer end 36 is closed with a cap 52, which is a metal disc having a pressed fit in the bulge 42, and retains the powder in the medicament tube 32. The inhaler may be enclosed in a light metal cup-shaped holder tube 54. The open end of the tube 54 may be pushed up under the skirt 40 of the medicament container 32 to form a substantially airtight seal therewith, held in place by friction. In place in the holder, the tube 10 and container 32 are restrained by the holder from movement to the relative positions of Figures 4 and 5.

As packaged, the inhaler contains a charge of powder 55 in medicament container 32, sealed in by the cap 52, and the holder 54 is pushed over to the inhaler and up under the skirt 40 to complete the finished package.

Figure 1:
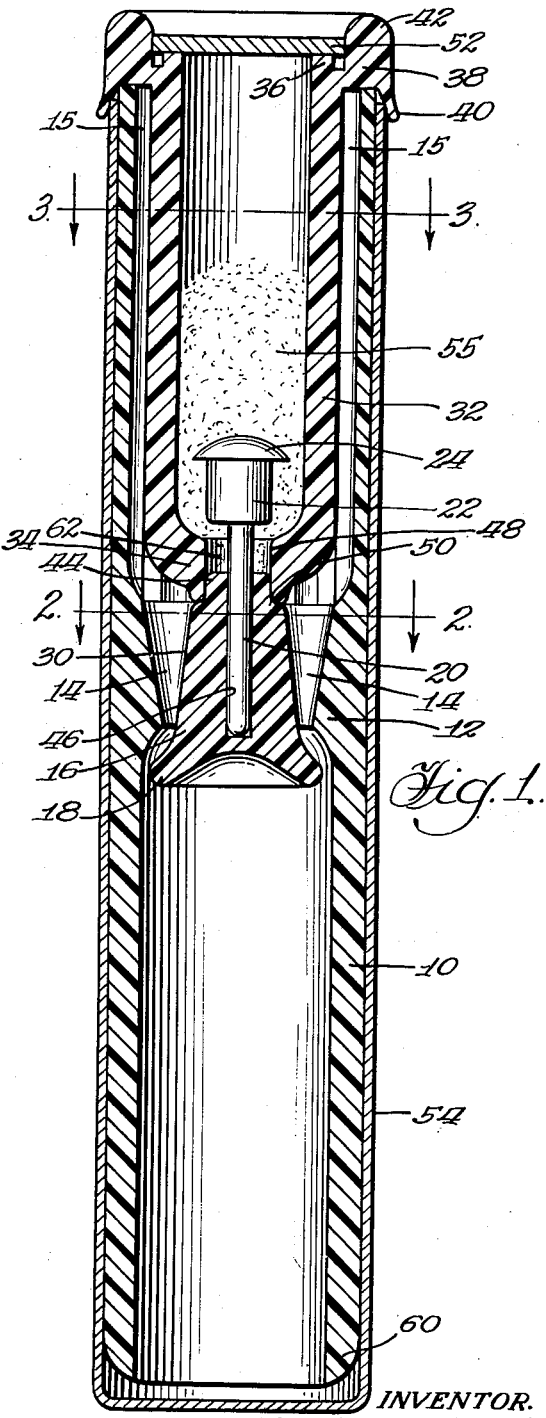
Figure 1 is a vertical section of an inhaler according to the invention.

The inhaler, as assembled in the finished package, is used by holding the inhaler in vertical position, as indicated in Figure 1, and grasping the lip 38 and the sheath 54 and pulling in opposite directions. The opposite displacement of the parts causes the medicament chamber 32 to slide along thhe barrel 10, through the position of Figure 4, and up to the crown 24, as shown in Figure 5. The sheath 54 is then completely withdrawn from the body of the inhaler, and the inhaler may be turned into the horizontal position shown in Figure 5. The user then places the inhaler end 60 in his mouth or nostril, as may be prescribed, and inhales. The inhalation causes air to move in through the slots 15, which provide air passages around the medicament container 32, and through the conical passages 14 and subsequently to the person of the user.

In the vertical position, and with the parts disposed as shown in Figure 1, powder in the chamber 55 fills the space 62 defined by the cylinder wall 48, the pin 20, the baffle end 44 and the enlargement 22. As the medicament chamber slides outwardly, the chamber 62 is first closed at the top, as in Figure 4, and subsequently opened at the bottom, as in Figure 5. Thus an exact volume of powder is liberated and may cascade down over the plug end 44 and come to rest on the shoulder 50 and in the holes 14, and if any powder goes through the holes 14, on the skirt 18. When air is then drawn through the inhaler, all this powder is picked up by the air and borne along into the person of the user.

For each subsequent inhalation the medicament container 32 is pushed into the tube 10 to the position of Figure 1, and subsequently pulled out to the position of Figure 5, to release successive increments of powder, all equal in amount.

The dose of the powder for each inhalation may be varied by changing the dimensions of the parts.

A preferred size for potent medicaments is about one-half inch outside diameter by two and one-half inches in length. In such a size the amount of each increment is so small that even a careful user could hardly measure it out by eye, without variations of from 30% to 100% on the successive doses. Also, the multiple air jets entering through the passages 15 set up a veritable tornado in the chambers and passages where this minute charge has been strewn around, compared with the amount of powder to be picked up, so that all the measured charge soon finds its way into the patient's body. Depth of penetration and point of final deposit in the patient's body cavity will depend on the density and grain size of the powder, which can be varied to secure best results.

Others may readily adapt the invention for use under various conditions of service by employing one or more of the novel features involved, or equivalents thereof. As at present advised with respect to the apparent scope of my invention, I desire to claim the following subject matter.

I claim:

1. An inhaler comprising a body having a passage therethrough; a container for powdered medicament reciprocably disposed in said passage; said container having a restricted tubular opening at one end; means rigid with said body and extending through said tubular opening and including spaced portions adapted to fit and telescope in said tubular opening; the wall of said tubular opening being of sufficient length to bridge the space between said spaced telescoping portions, thereby forming a chamber of predetermined capacity; and stop means for limiting the movement of said container in both directions; said stop means permitting the wall of said tubular opening to move far enough to clear said telescoping portions at either end, whereby the chamber defined may be opened to communicate with the interior of said container and receive powder or at the other end to discharge powder; said telescoping portions comprising a constriction in said passage having a central boss fitting said tubular opening and an axial pin rigid with said boss to support the other telescoping portion.

2. An inhaler comprising a body having a passage therethrough; a container for powdered medicament reciprocably disposed in said passage; said container having a restricted tubular opening at one end; means rigid with said body and extending through said tubular opening and including a pair of spaced portions adapted to fit and telescope in said tubular opening; the wall of said tubular opening being of sufficient length to bridge the space between said spaced telescoping portions, thereby forming a chamber of predetermined capacity; stop means adjacent said telescoping portions for limiting the movement of said container in both directions; said stop means permitting the wall of said tubular opening to move far enough to clear said telescoping portions at either end, whereby the chamber thus defined may be opened to communicate with the interior of said container and receive powder or at the other end to discharge powder; said telescoping portions comprising a constriction in said passage having a central boss fitting said tubular opening and an axial pin rigid with said boss to support the other telescoping portion; and powder receiving means positioned adjacent said constriction to receive powder dispensed from said container.

3. An inhaler according to claim 2 in which the powder receiving means is a plurality of conical holes having their large end adjacent said container.

4. An inhaler comprising a body having a passage therethrough; a container for powdered medicament reciprocably disposed in said passage; said container having a restricted tubular opening at one end; means rigid with said body and extending through said tubular opening and including spaced portions adapted to fit and telescope in said tubular opening; the wall of said tubular opening being of sufficient length to bridge the space between said spaced telescoping portions; stop means for limiting the movement of said container in both directions; said stop means permitting the wall of said tubular opening to move far enough to clear said telescoping portions at either end, whereby the chamber thus defined may be opened to communicate with the interior of said container and receive powder or at the other end to discharge powder; said telescoping portions comprising a constriction in said passage having a central boss fitting said tubular opening and an axial pin rigid with said boss to support the other telescoping portion; said constriction containing tapered holes therethrough with their large ends adjacent the discharge end of said chamber to receive discharged powder; the inlet end of said passage debouching in a plurality of small passages adjacent the remote end of said container; said small passages being aligned with the tapered holes in said constriction; said container having a flange adapted to close said small passages when said container is in engagement with said constriction; said constriction including retaining means at the small ends of said tapered passages adapted to function as a shelf and retain discharged powder until air flow through said passages dislodges it.

5. An inhaler comprising a main tube having a constriction intermediate the ends thereof; an outlet at one end of said tube; a powdered medicament container reciprocably disposed in said tube between said constriction and the opposite end of said tube; said container having a restricted tubular opening; a pin attached to said constriction, having an enlarged portion adapted to fit in and close said restricted opening; a boss on said constriction to fit in and close said restricted opening; stop means on said enlarged portion restricting outward movement of said medicament container; means in the nature of a predetermined-capacity cavity defined by said boss, said enlarged pin portion, and the wall of said restricted opening, to dispense a predetermined amount of powdered medicament from said medicament container onto said constriction, by the movement of the wall of said restricted opening from said boss to said stop means; and air passage means between said tube and said medicament container to direct a stream of air through said tube, whereby the movement of said stream of air picks up powder dispensed from said medicament container.

6. An inhaler comprising a main tube having a perforate constriction intermediate the ends thereof; an outlet at one end of said tube; a powdered medicament container reciprocably disposed in said tube between said constriction and the opposite end of said tube; said container having a restricted tubular opening; a pin attached to said constriction, having an enlarged end portion adapted to fit in and close said restricted opening; means on said constriction to fit in and close said restricted opening; stop means on said pin; said stop means and said constriction restricting movement of said medicament container therebetween; means in the nature of a predetermined-capacity cavity defined by said means on said constriction, said enlarged pin portion, and the wall of said restricted opening, to dispense a predetermined amount of powdered medicament from said medicament container onto said constriction, by the movement of the wall of said restricted opening from said constriction to said stop means; and air passage means between said tube and said medicament container, to direct a stream of air through said tube and said outlet, whereby the movement of said stream of air picks up powder dispensed from said medicament container.

7. An inhaler comprising, in combination: a main tube; a medicament container in the nature of a capsule reciprocable in one end of said main tube; said capsule having an enlarged head limiting its movement into said tube; said head having a skirt for external engagement with the end of said tube at the end of the inward movement; said capsule having a restricted tubular outlet at its inner end; means in the nature of stationary disposed means having a portion of reduced diameter and passing through said restricted opening for segregating a predetermined charge of powder when said opening is pushed inwardly beyond the adjacent end of said reduced portion; said stationary means including a shoulder limiting outward movement of said capsule and a cylindrical portion adjacent said shoulder adapted to fit in said restricted opening and form a tight seal; the wall of said restricted opening having a length not less than the reduced portion of said stationary means; discharge guide means positioned to receive a charge of powder; said discharge guide means discharging into an annular space; and an annular spreader beyond said annular space leaving a restricted annular opening into the discharge end of said main tube.

8. An inhaler comprising, in combination: a main tube; a medicament container reciprocable in one end of said main tube; a charge of medicament in said container; said container having an enlarged head limiting its movement into said tube; said head having a skirt for external engagement with the end of said tube at the end of the inward movement; said container having a restricted tubular outlet at its inner end; means in the nature of a stationary pin having a portion of reduced diameter and passing through said tubular outlet for segregating a predetermined charge of powder when said outlet is pushed inwardly beyond the adjacent end of said reduced portion; said pin including a shoulder limiting outward movement of said container and a cyclindrical portion adjacent said shoulder adapted to fit in said tubular outlet and form a tight seal; said tubular outlet having a length not less than the reduced portion of said pin; discharge guide means positioned to receive said segregated charge of powder falling out of said measuring chamber when said container is moved onto said cylindrical portion; said discharge guide means discharging into an annular space; an annular spreader beyond said annular space leaving a restricted annular opening into the discharge end of said main tube; and a cup-shaped cover enclosing said tube, and adapted to have the open end thereof sealed under said skirt when said container is in the innermost position.

MACK R. FIELDS.

REFERENCES CITED

The following references are of record in the file of this patent:

UNITED STATES PATENTS

| Number | Name | Date |
| --- | --- | --- |
| 1,525,828 | Reeve | Feb. 10, 1925 |